(12) United States Patent
Watson et al.

(10) Patent No.: US 10,108,788 B2
(45) Date of Patent: Oct. 23, 2018

(54) FAST-EXPIRING LICENSES USED TO SPECULATIVELY AUTHORIZE ACCESS TO STREAMING MEDIA CONTENT

(71) Applicants: Mark Watson, San Francisco, CA (US); Anthony Neal Park, Los Gatos, CA (US); Mitch Zollinger, San Jose, CA (US)

(72) Inventors: Mark Watson, San Francisco, CA (US); Anthony Neal Park, Los Gatos, CA (US); Mitch Zollinger, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 433 days.

(21) Appl. No.: 14/023,447

(22) Filed: Sep. 10, 2013

(65) Prior Publication Data

US 2015/0074818 A1 Mar. 12, 2015

(51) Int. Cl.
*G06F 21/10* (2013.01)
*H04N 21/4405* (2011.01)
*H04N 21/466* (2011.01)
*H04N 21/482* (2011.01)
(Continued)

(52) U.S. Cl.
CPC ....... *G06F 21/105* (2013.01); *H04N 21/4405* (2013.01); *H04N 21/4668* (2013.01);
(Continued)

(58) Field of Classification Search
CPC .................................................... G06F 21/105
See application file for complete search history.

(56) References Cited

U.S. PATENT DOCUMENTS 7,853,995 B2 * 12/2010 Chow ................. H04L 63/0807
713/175
2007/0130068 A1 * 6/2007 Kitazato ............ H04N 21/2541
705/50
(Continued)

FOREIGN PATENT DOCUMENTS

| CN | 101562726 A | 10/2009 |
| CN | 101772960 A | 7/2010 |
| EP | 2175652 A1 | 4/2010 |

OTHER PUBLICATIONS

Extended European Search Report for Application No. 14183835.9 dated Dec. 11, 2014.

*Primary Examiner* — Saleh Najjar
*Assistant Examiner* — Devin E Almeida
(74) *Attorney, Agent, or Firm* — Artegis Law Group, LLP

(57) ABSTRACT

Techniques are disclosed for improving user experience of multimedia streaming over computer networks. More specifically, techniques presented herein reduce (or eliminate) latency in playback start time for streaming digital media content resulting from digital rights management (DRM) authorizations. A streaming media client (e.g., a browser, set-top box, mobile telephone or tablet "app") may request a "fast-expiring" license for titles the streaming media client predicts a user is likely to begin streaming. A fast-expiring license is a DRM license (and associated decryption key) which is valid for only a very limited time after being used for playback. During the validity period of such a license, the client device requests a "normal" or "regular" license to continue accessing the title after the fast-expiring license expires.

24 Claims, 6 Drawing Sheets

(51) Int. Cl.
*H04N 21/6334* (2011.01)
*H04N 21/8355* (2011.01)
*H04N 21/84* (2011.01)

(52) U.S. Cl.
CPC ..... *H04N 21/4826* (2013.01); *H04N 21/6334* (2013.01); *H04N 21/8355* (2013.01); *H04N 21/84* (2013.01)

(56) References Cited

U.S. PATENT DOCUMENTS

| | | | |
|---|---|---|---|
| 2008/0089516 A1* | 4/2008 | Cocchi | H04N 5/913 380/200 |
| 2008/0255994 A1* | 10/2008 | Schnell | G06Q 30/02 705/52 |
| 2008/0294894 A1 | 11/2008 | Dubhashi et al. | |
| 2009/0058822 A1* | 3/2009 | Chaudhri | G06F 3/04883 345/173 |
| 2012/0226915 A1 | 9/2012 | Zollinger et al. | |
| 2012/0260214 A1 | 10/2012 | Krishnamurthy et al. | |
| 2012/0331167 A1 | 12/2012 | Hunt | |
| 2013/0042271 A1* | 2/2013 | Yellin | H04N 5/765 725/41 |
| 2013/0160146 A1* | 6/2013 | Kaiser | G06F 21/00 726/30 |
| 2013/0179199 A1 | 7/2013 | Ziskind | |
| 2015/0052585 A1* | 2/2015 | Matthews | H04L 63/0823 726/4 |

* cited by examiner

FAST-EXPIRING LICENSES USED TO SPECULATIVELY AUTHORIZE ACCESS TO STREAMING MEDIA CONTENT

BACKGROUND OF THE INVENTION

Field of the Invention

Embodiments presented in this disclosure generally relate to streaming media services. More specifically, embodiments presented herein relate to techniques for speculatively pre-authorizing encrypted data streams using fast-expiring licenses.

Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology and provide both audio and video data.

The digital content distribution system may implement various digital rights management (DRM) schemes to limit access to protected content. DRM is an access control technology that limits or inhibits the use or playback of digital content. For example, the digital content file may be restricted to playback on only authorized devices. DRM may be implemented using data encryption techniques that require the user to obtain a license (and decryption key) in order to decrypt the digital media content.

Prior to playing a streaming media title, the content player may be required to perform a series of steps, such as requesting metadata, requesting location data for the content files (e.g., a collection of URLs), and obtaining a DRM license and decryption key. Processing these requests, particularly the process for securely distributing a cryptographic key, can substantially delay the time between when a user requests to stream a given media title and when playback of that title can actually begin. Such delays can negatively impact user experience.

SUMMARY

One embodiment of the invention includes a method for presenting multimedia content. This method may generally include presenting, in a streaming media interface, a set of one or more media titles available for streaming from a library of media titles. Prior to receiving a request to stream a first one of the media titles from the library, a request is sent for a fast-expiring license for at least the first media title. The fast-expiring license is valid for a fixed time interval after playback of the first media title begins. Further, the fixed interval is substantially less than a playback time of the first media title. This method may also include receiving the requested fast-expiring license.

In a particular embodiment, the method may also include sending a request for metadata describing a file storing the first media title. And may further include, in response to receiving a request to stream the first media title from a user interacting with the streaming media interface, (i) retrieving an encrypted first portion of the first media title, (ii) decrypting the encrypted first portion using a key associated with the fast-expiring license, and (iii) initiating playback of the first portion of the first media title on the streaming media interface.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
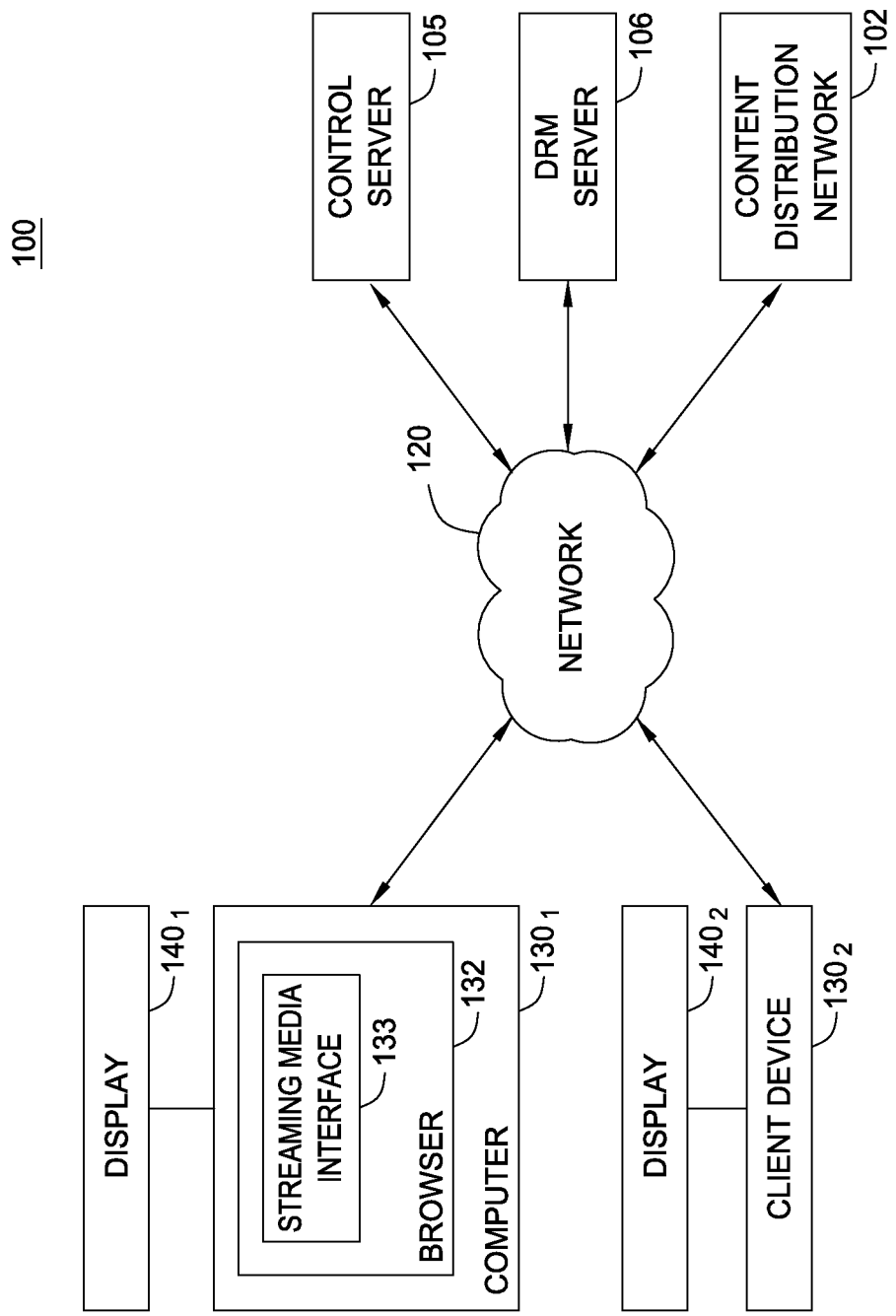
FIG. 1 illustrates a content distribution system configured, according to one embodiments presented.

Embodiments of the invention provide techniques to reduce (or in many cases virtually eliminate) latency in playback start time for streaming digital media content resulting from digital rights management (DRM) authorizations. Playback start time, i.e., the time from when a user requests to stream an item and the time that content actually begins being displayed, is a significant aspect of overall quality of experience. Put simply, people are generally impatient and long start times for streaming video leads to a poor user experience. Conversely, faster start times improve user experience improving user retention.

One approach to reduce start time latency is to make a short portion of the beginning of a media title available in an unencrypted form, allowing playback to begin without obtaining a DRM license. The DRM license is then obtained while the unencrypted content is streamed and played back. While this works for streaming media titles viewed from the beginning, a substantial number of users may request to view content from beginning from other points of the media title. For example, a user may desire to resume streaming a title from a previously saved bookmark. As another example, a streaming service may automatically jump past opening segments of a television program when a client streams successive episodes of that program. While it may be possible to make multiple short portions of a media title available in unencrypted form, supporting fast playback at any of those points, the majority of the media title generally remains available only in encrypted form, to protect against unauthorized playback of the title.

A streaming media client may be configured to perform functions that are not actually required until a title is selected for playback in advance. That is, the client may speculatively prepare to play content items that the client predicts the user might play. For example, the client device may select to pre-authorize titles previewed on the user interface. The speculative functions can include obtaining authorization from servers for playback, obtaining URLs for the media files and downloading media file headers and media data. The streaming media client may be a browser rendering an interface to a streaming media service, a set top box running a client application, or an "app" running on a mobile phone or tablet.

In one embodiment, the speculative functions may include requesting a "fast-expiring" license. A fast-expiring license is a DRM license (and associated decryption key) which is valid only for very limited time after being used for playback. For example, a fast-expiring license for a 120 minute movie may authorize a user to access only two-minutes of content once playback begins. During the validity period of such a license, the client device requests a "normal" license to continue accessing the title after the fast-expiring license expires. Once the validity period for the fast-expiring license elapses, the playback may continue only if the client successfully obtains a "normal" license. A fast-expiring license may also have an absolute expiry time, e.g., 48 hours after it is obtained. Further, like a "normal" or "regular" DRM license, the fast-expiring license may be valid for a specific title and specific client, and may be limited to providing a valid decryption context for a title only once.

Advantageously, the perceived (and actual) delay resulting from DRM authorizations may be reduced or eliminated. Further, this approach does not disrupt any accounting or payment issues related to the DRM scheme. For example, a streaming media service may rely on the issuance of DRM licenses as the authoritative indicator of playback-in-progress. Specifically, accounting for concurrent stream limits (i.e., the maximum number of streams a user may have active at the same time on the same account), which is based on the number of issued licenses, remains unchanged. Instead, the fast-expiring licenses do not participate in this accounting and it is safe to issue large numbers of these to clients, as each can be used to view only a limited amount of a title. Note, the DRM service may be configured to prevent multiple expiring licenses for the same content item to be issued to the same client.

Similarly, any timers for rental periods based on the issuance of a DRM license or transaction based fees associated with the issuance of a DRM license are unaffected. For example, a streaming service may allow clients a limited period to view a title once playback begins or to preview a title prior to payment. In such cases, the issuance of a DRM license is the triggering event for the time window, while the fast-expiring license, which is issued for titles the client application predicts a user might view, do not trigger any timers or fees. Instead, the accounting systems can rely on a client request for a normal DRM licensee to a title as the secure indication that playback has started, which occurs while the fast-expiring license is used to access encrypted content.

In one embodiment, a client may request a fast-expiring license for any titles a user has bookmarked when a user accesses a streaming media service. Similarly, if the client application renders a set of titles in a particular category or in response to a keyword search, the client may request a fast-expiring license for a title currently highlighted or selected by a user. As another example, if a user interrupts a title being viewed, them the client might preemptively request a fast-expiring license as part of shutting down an active streaming session. In each of these cases, the fast-expiring license allows the client to decrypt streaming media content without interrupting any accounting or transaction functions that rely on the issuance of DRM licenses as an authoritative indication that a user has initiated playback. Further, the fast-expiring license allows the client to decrypt streaming media content, while the client requests and obtains a normal DRM license, reducing (or eliminating) delay in playback start time that might otherwise result from DRM authorizations.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention. Further, while the following description uses a streaming media service as a reference example for a content distribution system that uses fast-expiring licenses, embodiments of the invention may be adapted for use in other systems, e.g., a streaming music service or other services providing access to digital content.

FIG. 1 illustrates an example computing infrastructure 100 used to provide streaming media content to client systems $130_{1-2}$, according to one embodiment of the invention. As shown, the computing infrastructure 100 includes a content distribution network (CDN) 102, a streaming media control sever 105, DRM server 106 and client systems $130_1$, $130_2$, each connected to a communications network 120.

The client systems $130_{1-2}$ communicate with the control server 105 over the network 120 to access streaming media titles distributed by the CDN 102. As described in more detail below, the control server 105 presents an interface to a streaming media library. For example, the control server 105 may allow a user to present credentials, identify titles, download metadata related to titles, etc.

In this particular example, client system $130_1$ represents a computer system running a web-browser 132. Accordingly, client system $130_1$ is representative of desktop PCs, laptop computers, home-theater PCs (HTPCs), tablet computers, mobile telephones, set-top-boxes, DVD players, digital media receivers, and other computing systems capable of running a web-browser. The web-browser 132 is configured to obtain a streaming media interface 133 from the control server 105, rendered on a display $140_1$, e.g., an LCD monitor. In one embodiment, the streaming media interface 133 provides a content browsing mode used to present previews of titles, to search for titles by keyword or category, etc., as well as to initiate streaming of actual content. Further, when presenting previews of titles or search results, the interface 133 may request a fast-expiring license from DRM server 106 for a title the interface predicts a user is likely to play. Note, as shown in FIG. 1, the clients contact the DRM server directly. However, in another embodiment, interaction with the DRM server 106 is mediated through the control server 105. In such an embodiment, the client components contact the control server 105 and the control server 105 contacts the DRM server 106 to request a fast-expiring license (as well as to request a "regular" DRM license).

Client system $130_2$ represents a set-top device connected to both network 120 and a display 140 (e.g., a flat-panel television). Accordingly, client system $130_2$ is representative of digital cable boxes, digital video recorder (DVR) systems, video game consoles, and other streaming media devices, as well as DVD players capable of connecting to a network 120 and receiving and playing back media streams provided by control server 105. For example, some Blu-ray® disc players can download and execute BD-live applications. In such a case, the disc player could connect to the control server 105 and download interface components used to select and playback media streams. Further, display $140_2$ may itself be a television integrated with electronic components capable of connecting to the network 120 playing back media streams. For example, some flat-panel television displays include integrated components used to connect to a streaming media service, video on demand services, or video sharing websites.

Streaming media control server 105 provides a computing system configured to transmit media streams (or links to media streams) to clients $130_{1-2}$. For example, control server 105 may include a web-server, database, and application server configured to respond to requests for web pages and/or streaming media files received from web-browser 132 as well as requests from software components executing on the client device $130_2$ or a television integrated with streaming media components. The content itself may be distributed from the control server 105 or through broader content distribution networks, e.g., CDN 102. For example, in one embodiment, the control server 105 allows a viewer to authenticate themselves to the streaming media provider (e.g., using a username and password). Once a given viewer is authenticated, the control server 105 may generate a set of titles to be previewed using the streaming media interface 133. The set of titles may be transmitted to the interface 133 as a set of links (e.g., HTTP URLs) to streaming media content available from the control server 105 or CDN 102. Logic included in the streaming media interface 133 may then begin downloading and playback for one of the titles accessed by one of the links.

In one embodiment, the CDN 102 includes computer systems that serve download requests for digital content files received from the clients $130_{1-2}$. The digital content files may reside on a storage devices accessible to CDN 102, such as direct attached storage, network attached file storage, or network attached block-level storage. The well-known hyper-text transfer protocol (HTTP), may be used to download digital content files from the CDN 102 to the clients $130_{1-2}$.

As noted, the control server 105 may be configured to respond to requests for metadata associated with digital content files. The metadata is used to request digital content and to request a license used to decrypt a digital content file. In some embodiments, the metadata includes indicate network addresses for specific items of digital content, e.g., a set of Uniform Resource Identifiers (URI). The metadata may also include stream headers which indicate locations of chunks in the content files. In one embodiment, the metadata related to a particular streaming media title may include a DRM header. The DRM header includes information used to compose a request for a DRM license for a particular title from DRM server 106.

More generally, the DRM server 106 responds to requests for licenses associated with encrypted digital content files. As noted, access to the DRM server 106 may be mediated via the control server 105. However, the DRM server 106 may also be configured to respond to request from clients 130 directly. In operation, encrypted digital content downloaded from the CDN 102 by the clients $130_{1-2}$ needs to be decrypted before the digital content file can be decoded and played back to a viewer. In one embodiment, The DRM server 106 transmits the license associated with the encrypted digital content to the client $130_{1-2}$, (via the control server 105) which in turn uses a key included in the license to decrypt the digital content file. In one embodiment, the clients $130_{1-2}$ may request a fast-expiring license for a title, prior to receiving a user request to actually view that title. As noted, e.g., a fast-expiring license may be requested for a title highlighted in a set of search results or in a category list. Similarly, a fast-expiring license may be requested for a title that a user began viewing in a prior session, resulting in a bookmarked starting point for that title. More generally, the clients $130_{1-2}$ may be configured to request a fast-expiring license from the DRM server for any title the client $130_{1-2}$ predicts the user is likely to begin viewing as part of the current streaming session.

Should a user request to view a title for which a fast-expiring license is available, the clients $130_{1-2}$ may begin streaming encrypted content which is then decrypted using the fast-expiring license. However, once playback begins, the fast-expiring license is valid for a limited time, e.g., two-minutes. During that limited period, the clients $130_{1-2}$ requests a regular license used to continue accessing encrypted content associated with the title being viewed after the fast-expiring license expires. By requesting fast-expiring licenses for content the clients $130_{1-2}$ predict a user is likely to view, latency associated with DRM authorizations can be reduced or eliminated. At the same time, the fast-expiring license allows the user to begin streaming at any point within a streaming media title. Doing so allows the user to resume viewing a title, without having the latency of DRM authorizations.

Note, while illustrated as separate server systems, some or all of the functionality of the DRM server 106 or the CDN 102 may be integrated into the control server 105.

Figure 2:
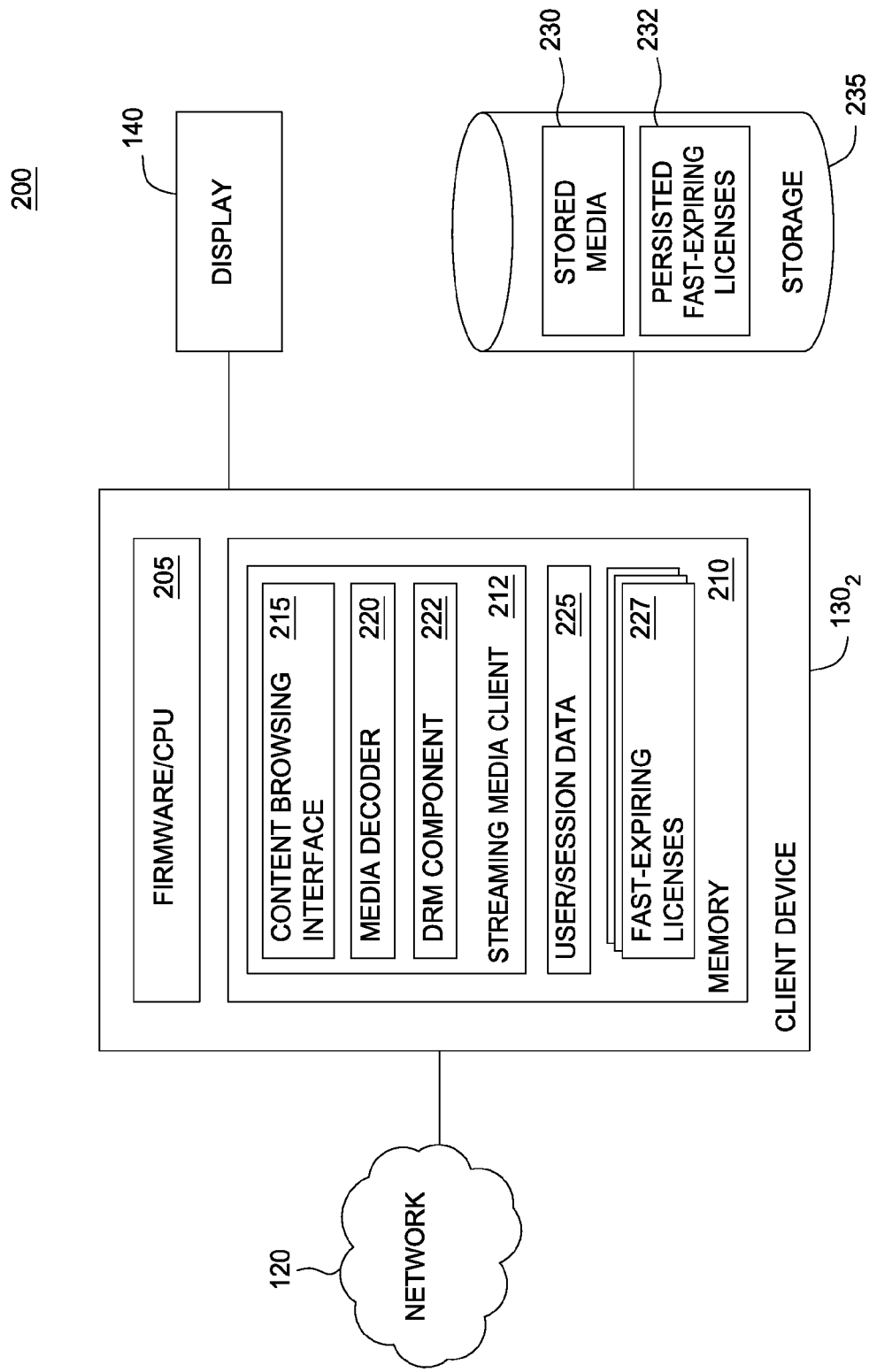
FIG. 2 illustrates a streaming media client device configured to request fast-expiring licenses from a DRM Server, according to one embodiment.

FIG. 2 illustrates an example of a client device $130_2$ used to view streaming media content, according to one embodiment of the invention. In this example, a streaming media client device is connected to both a display 140 (e.g., a flat panel television) and a network 120. Note, client device $130_2$ is included to be representative of a cable-set top box, a digital video recorder (DVR), or television with integrated streaming functionality, as well as dedicated streaming devices (e.g., a Roku® device) connected to a television display. However configured, the client device $130_2$ may be capable of streaming media content from a variety of different service providers. Client device $130_2$ is also shown connected a storage repository 235 of stored media 230, representing locally stored content that is available for playback on display 140. Storage 235 also contains a set of any persisted fast-expiring licenses 232.

In one embodiment, the client device $130_2$ may pre-fetch and store multiple fast-expiring licenses and then use any of the stored licenses for playback. For example, if a user interrupts a title, a fast-expiring license 232 may be stored in storage 235, allowing the client to resume viewing that same title later using the persisted fast-expiring license 232. More generally, fast-expiring licenses may be persisted to disk storage 235 across viewing sessions. Doing so may avoid the need to re-fetch expiring licenses each time the streaming media client 212 restarts.

In one embodiment, the client device $130_2$ is configured to allow users to preview media content streamed over network 120 using a content browsing interface 215. As shown, the client device $130_2$ includes firmware 205, memory 210, and storage 235. The firmware 205 represents operating logic used to control the client device $130_2$. For example, the firmware 205 may be configured to allow users to schedule recordings, connect to streaming media services, select content for playback, as well as render an interface configured to preview titles available from a streaming media service. Content retrieved over the network 120 may be buffered in storage 235 prior to being decoded and presented on display 140.

Illustratively, the memory 210 includes user/session data 225, a set of fast-expiring licenses 227, and a media client 212, which itself includes a media decoder 220, a DRM component 222, and a content browsing interface 215. The streaming media client 212 provides software on the client device $130_2$ used to access a given streaming media service. And the media decoder 220 is generally configured to decode and generate display frames from data streamed over the network 120, whether as part of content browsing interface 215 or otherwise. The DRM component 222 may be configured to communicate with a DRM server to obtain DRM licenses and cryptographic keys used by a particular client device to decrypt a particular media site during a streaming session.

In one embodiment, the content browsing interface 215 may be configured to communicate with a given streaming media service to preview a set of titles, submit queries requesting titles related to a given category or keyword. To that end, the streaming media client 212 may be configured to connect to a streaming media service, authenticate itself, e.g., using credentials entered by a user or stored as part of user/session data 225, and allow a user to select content to view on display 140.

For example, a user may initiate a content browsing mode, where titles available for streaming are previewed to the viewer on the content browsing interface 215. In this mode, the content browsing interface 215 may be configured to determine a set of titles available from the streaming media service to preview as part of a browsing session. Once determined, the DRM component 222 may request a fast-expiring license 227 for any of the titles previewed on the content browsing interface 215 that the client 212 predicts is likely to be selected for streaming by the user. Of course, the DRM component 222 may request fast-expiring licenses for titles not currently being previewed, e.g., media titles not fully viewed during a previous streaming session. Note, in the present context, "previewed" generally refers to a display of media titles which the user may select and begin streaming. Once obtained, should the user select to view a title for which a fast-expiring license 227 was requested, the client 212 may immediately begin streaming that title from the service and decrypt content using the fast-expiring license 227. The resulting decrypted content is then passed to the decoder 220, which generates audiovisual data presented to the viewer. In addition to storing user credentials and account data, user/session data 225 may record what titles have been previewed to a user and whether a fast-expiring license 227 is available for a given title.

Figure 3:
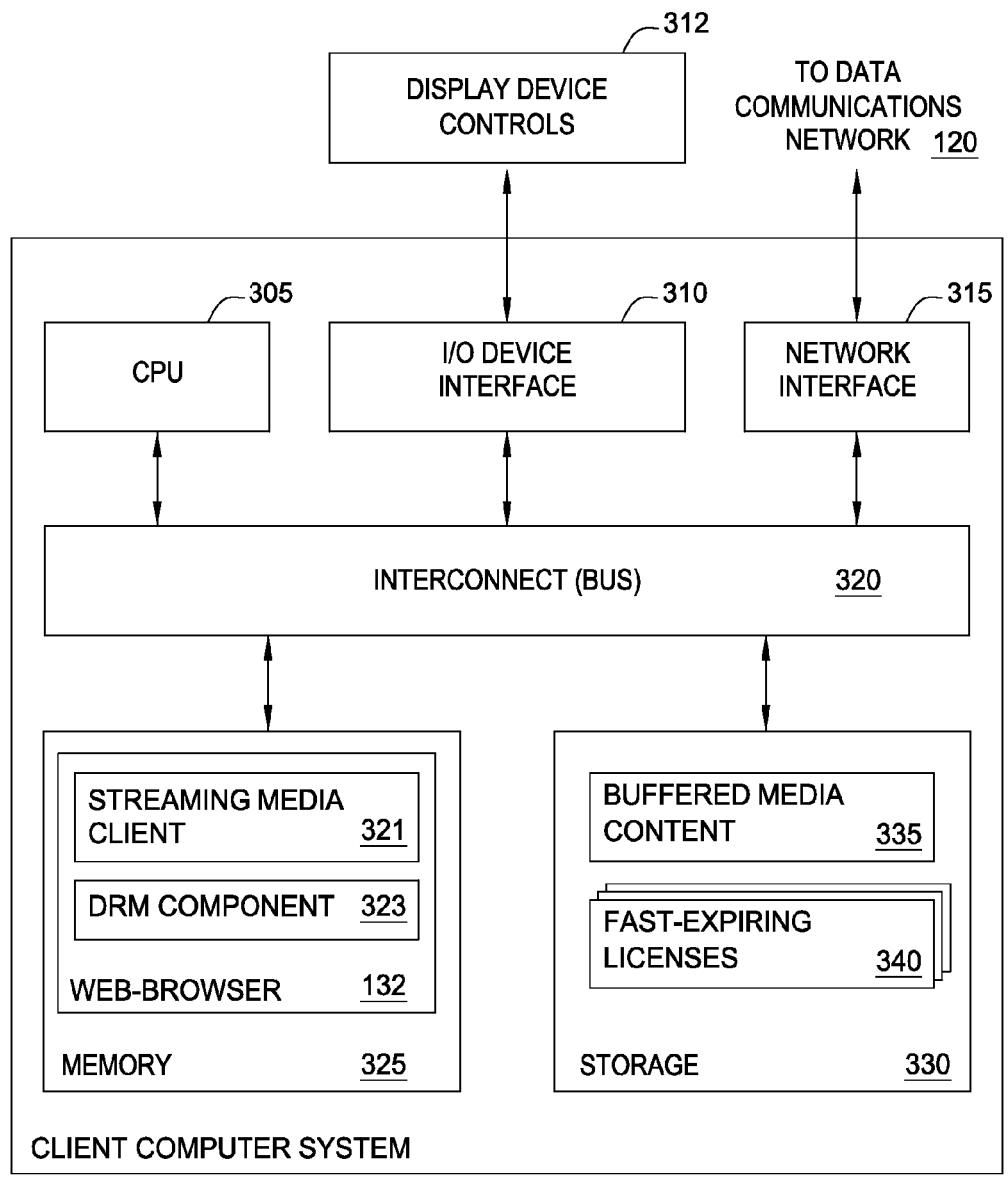
FIG. 3 illustrates a computing device configured to request fast-expiring licenses from a DRM Server, according to one embodiment.

FIG. 3 illustrates an example of a client computing system $130_1$ used to view streaming media content, according to one embodiment of the invention. As shown, the client computing system $130_1$ includes, without limitation, a central processing unit (CPU) 305, a network interface 315, a bus 320, a memory 325, and storage 330. The computing system $130_1$ also includes an I/O device interface 310 connecting I/O devices 312 to the computing system $130_1$ (e.g., a keyboard, mouse, or remote control, along with a monitor (e.g., an LCD panel).

CPU 305 is included to be representative of a single CPU, multiple CPUs, a single CPU having multiple processing cores, etc., and the memory 325 is included to be representative of a random access memory. The bus 320 connects CPU 305, I/O devices interface 310, storage 330, network interface 315, and memory 325. The network interface 315 is configured to transmit data via the communications network 120, e.g., to stream media from the server system 105. Storage 330, such as a hard disk drive or solid-state (SSD) storage drive, may store audio video data files along with other content.

Illustratively, the memory 325 includes a web browser 132, which itself includes a streaming media client 321 and DRM component 323. The storage 330 stores buffered media content 335 and any persisted fast-expiring licenses 337. The browser 132 provides a software application which allows a user to access web pages and other content hosted by a server. In context of the present disclosure, the streaming media client 321 generally corresponds to software components retrieved from a streaming media service in order to playback media content from that streaming media service and the DRM component 323 corresponds to software components retrieved from the streaming media service used to request DRM licenses, both fast-expiring and "normal" content licenses, from the service. Content downloaded from the streaming media service may be stored in storage 330 as buffered media content 335 prior to being decoded and played back by streaming media client 321. Similarly, any fast-expiring licenses 337 requested by the DRM component 323. Such fast-expiring licenses 337 may include licenses requested as part of a current viewing session, e.g., requested for a title currently presented on the client 321 to a user. Such fast-expiring licenses 337 may also include licenses saved from other sessions, e.g., for a fast-expiring license 337 requested for a title previewed to a user, but not viewed by that user, or for a fast-expiring licenses 337 requested by the client 321 after a viewer interrupts viewing a title in the middle.

The streaming media client 321 may be generally configured to provide the functionality as described above relative to the streaming media client 212 of the client device $130_2$ shown in FIG. 2. Accordingly, the streaming media client 321 may include a content browsing interface configured to present titles by category, respond to searches, and to perform other navigation functions.

Referring to FIGS. 1-3 together, the content distribution system 100 is configured to begin playback of a media title using a fast-expiring license requested by the client prior to the user indicating playback of a media title. In particular, the client may request a fast-expiring license for one (or more) titles being previewed to the user. While decoding and playing content decrypted using the fast-expiring license, the client device $130_{1-2}$ is configured to request a DRM license from the DRM server 106 to continue decrypting the encrypted content once the fast-expiring license expires.

As described, client 130 fetches metadata and/or stream headers and a fast-expiring license for a specific media title, prior to a user requesting to play that specific media title. In some embodiments, e.g., a streaming media client may determine that a user is likely to request playback of a specific media title. In response to making such a determination, the client $130_{1-2}$ transmits a request for metadata and/or stream headers for the files including content for the specific media title along with a request for a fast-expiring license. In other cases, a user may request to begin playback of a title at a point where they left off playing during a prior viewing session. In such cases, the streaming media client may have requested a fast-expiring license when the user interrupted viewing the media title. Alternatively, when initiating a new viewing session, the client may request a fast-expiring license for any titles the user has watched.

Of course, the parameters for requesting a fast-expiring license may be tailored as desired for a particular service or client. For example, a user may have to complete watching a certain minimum percentage of a title in one viewing session before the client speculatively prepares to play that title (by downloading metadata and requesting a fast-expiring license) in a subsequent viewing session. Similarly, the number of speculative pre-authorizations, the validity period of a fast-expiring license, and the lifetime validity for a fast-expiring license may generally be set as a matter of preference.

Figure 4:
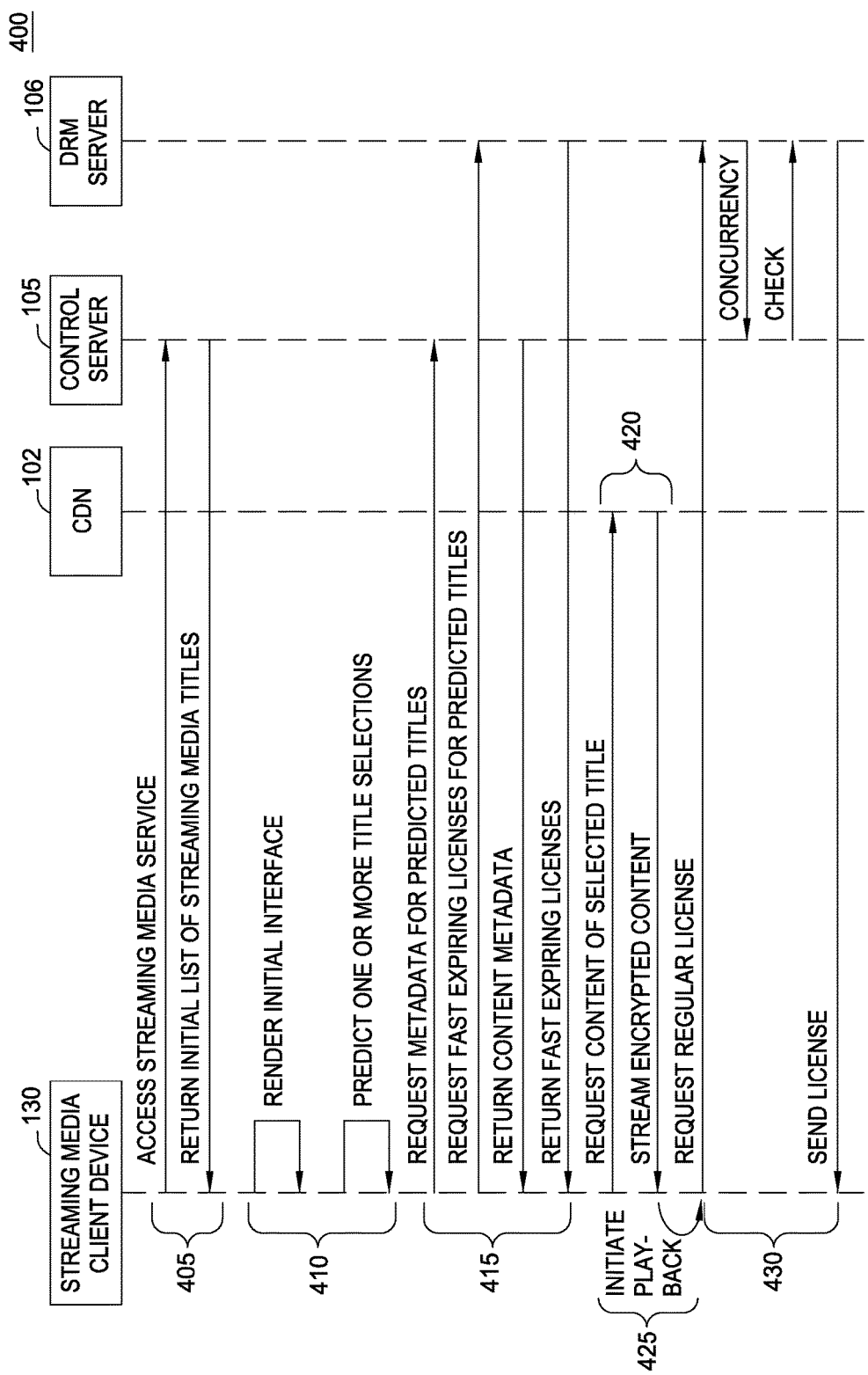
FIG. 4 is a sequence diagram illustrating an example set of interactions between the computing systems of FIGS. 1-3, according to one embodiment.

FIG. 4 is a sequence diagram 400 illustrating an example set of interactions between the computing systems of FIGS. 1-3, according to one embodiment. As shown, the sequence begins when a streaming media client device 130 initiates a streaming session. At 405, the streaming media client accesses a control server 105 hosting the streaming media service. In response, the control server 105 returns an initial list of streaming media titles to preview to the user and any other interface components. For example, in the case of a browser, the control server may return the streaming client used to decode and playback media data along with the DRM component used to request both fast-expiring licenses and regular content licenses. In addition, the streaming media client device 130 may identify a set of titles cached by the client device, (e.g., any titles partially viewed during a prior session).

At 410, the client renders a streaming media interface. Such an interface may present the list of titles returned at 405 as well as provide controls for searching for titles as well as navigating through a list of available media titles. For example, the interface may include a control which allows the user to highlight one of the previewed titles and to present additional information about that title. In addition, at 410, the client device 130 may predict one or more titles that the user is likely to begin viewing. For example, the client device 130 may identify whether the user completed viewing a title in the last session, or whether the user has highlighted one of the previewed titles, or selected a category or provided keywords. In each of these cases, the client device 130 may predict which title (or titles) the user is likely to select to stream.

At 415, the client device 130 begins speculatively pre-authorizing the predicted title (or titles). For example, the client device 130 may request location data and title metadata from the control server 105, e.g., the client device 130 may request URLs indicating a CDN from which the encrypted title can be streamed, an index of where chunks of data the files, etc. The client may also request a fast-expiring license from the DRM server 106. In response, the DRM server 106 returns the fast-expiring licenses and the control server 105 returns the requested metadata. As shown, the client 130 requests the fast-expiring license from the DRM server 106 directly. In an alternative embodiment, the control server 105 brokers requests and responses between the DRM server and the client 130.

At 420, the client device 130 begins to request content of a user-selected title. For example, the user may select to begin viewing a new title previewed in response to a search, or the user could select to continue viewing a prior title. Once the user requests to view a title, the client device 130 requests streaming media data from the CDN 102. At 425, client device 130 decrypts content streamed form the CDN using licenses keys in the fast-expiring license. As noted, once the fast-expiring license is used to decrypt content, it expires shortly thereafter. For example, once used, the fast-expiring license may expire two-minutes later. Of course, the exact amount time may be tailored as needed for a streaming service (or even individual title). However, it is expected that the fast-expiring license will be of substantially shorter duration than the underlying title (e.g., it may authorize streaming of two-minutes of a two-hour movie). The fast-expiring license needs to give the client enough time to complete a request for a regular DRM license to continue viewing the title, an operation that typically requires at most a few seconds. Accordingly, also at 425, the client device 130 requests a regular DRM license from a DRM server 106.

Note, the term "regular" DRM license is used to distinguish it from the fast-expiring license. At 430, once requested, the control server 105 and DRM server 106 perform any accounting or other functions associated with the issuance of a content viewing licensee. That is, the issuance of "regular" license is used as an authoritative signal that a user is viewing content. And any accounting, concurrency limit checks, or timers, triggered by the user actually consuming content is performed relative to the issuance of a DRM license. Note, the streaming media service may aggregate system metrics for business intelligence purposes based on the fast-expiring licenses. For example, the service may include time spent streaming using the fast-expiring license in measures of aggregate streaming time. Similarly, some individual user-accounting functions may include time spent streaming using fast-expiring licenses, but recognize that only the time reported based on the "regular" license is truly secure for other functions (e.g., for determining whether a user has reached a concurrent stream limit). That is, the issuance of a fast-expiring license does not trigger any of the actions requiring a secure measure of user activity, as the fast-expiring license is performed speculatively to reduce (or eliminate) the latency resulting from DRM authorizations, and does not authoritatively correspond to a user viewing content. After sending the "regular" license, the client device 130 transitions to using the decryption keys associated with that license to continue decrypting media data streamed from the CDN 102.

Figure 5:
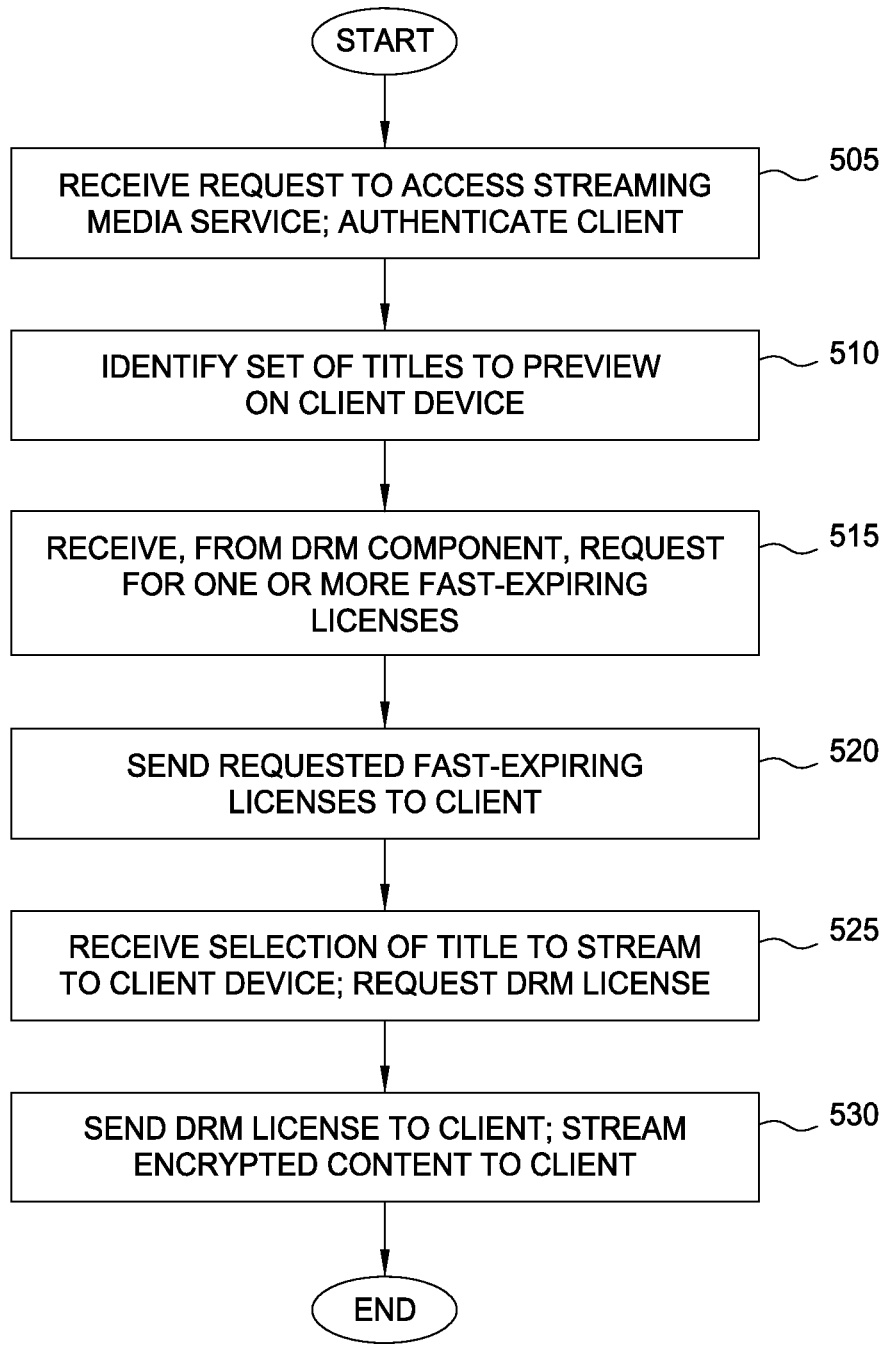
FIG. 5 illustrates a method for a control server and or a DRM server to respond to requests from a client to preview and stream digital content, according to one embodiment.

FIG. 5 illustrates a method 500 for a control server and/or DRM server to respond to requests from a client to preview and stream digital content, according to one embodiment. As shown, the method 500 begins at step 505, where the control server receives a request to access a streaming media service. In response, the control server may authenticate the client. For example, the service may require a client to provide a username and password (or other credentials) to access the service. The service may also confirm an account standing for the user. Once authenticated, at step 510, the control server may identify a set of titles to preview on the client device. For example, the control server may return a streaming media client and DRM component to a browser, along with data for an initial set of available titles. Once rendered the user may interact with the streaming media client to select a title to play, or navigate the interface to identify other titles.

At step 515, the DRM server receives a request for one (or more) fast-expiring licenses. As noted, the streaming media client may predict a title (or titles) that the user is likely to view, e.g., based on the titles previewed, the most popular titles in general, titles selected by this user, partially viewed titles etc. In response, at step 520, the DRM server sends one or more fast-expiring licenses to the client device. As described, the fast-expiring licenses allows a specific client to decrypt and access a specific title, but is valid only for a very limited period once the user begins viewing the specific title. Even if not used to view the corresponding title, the fast-expiring license may expire after some period (e.g., 24-48 hours). At step 525, the client requests to begin streaming a title e.g., the client begins sending HTTP requests for portions of a file storing media content. Initially, the fast-expiring license is used to decrypt the content. While this occurs for the initial streamed content, and prior to the fast-expiring license expiring, the client device sends a request for a regular license. At step 530, once this request is received, the DRM server sends a license to the client (and the control server performs any accounting, security, billing, or concurrent streaming checks). Once the client receives the DRM license, it may transition from using the fast-expiring license to the "regular" DRM license and continue streaming a media title.

Figure 6:
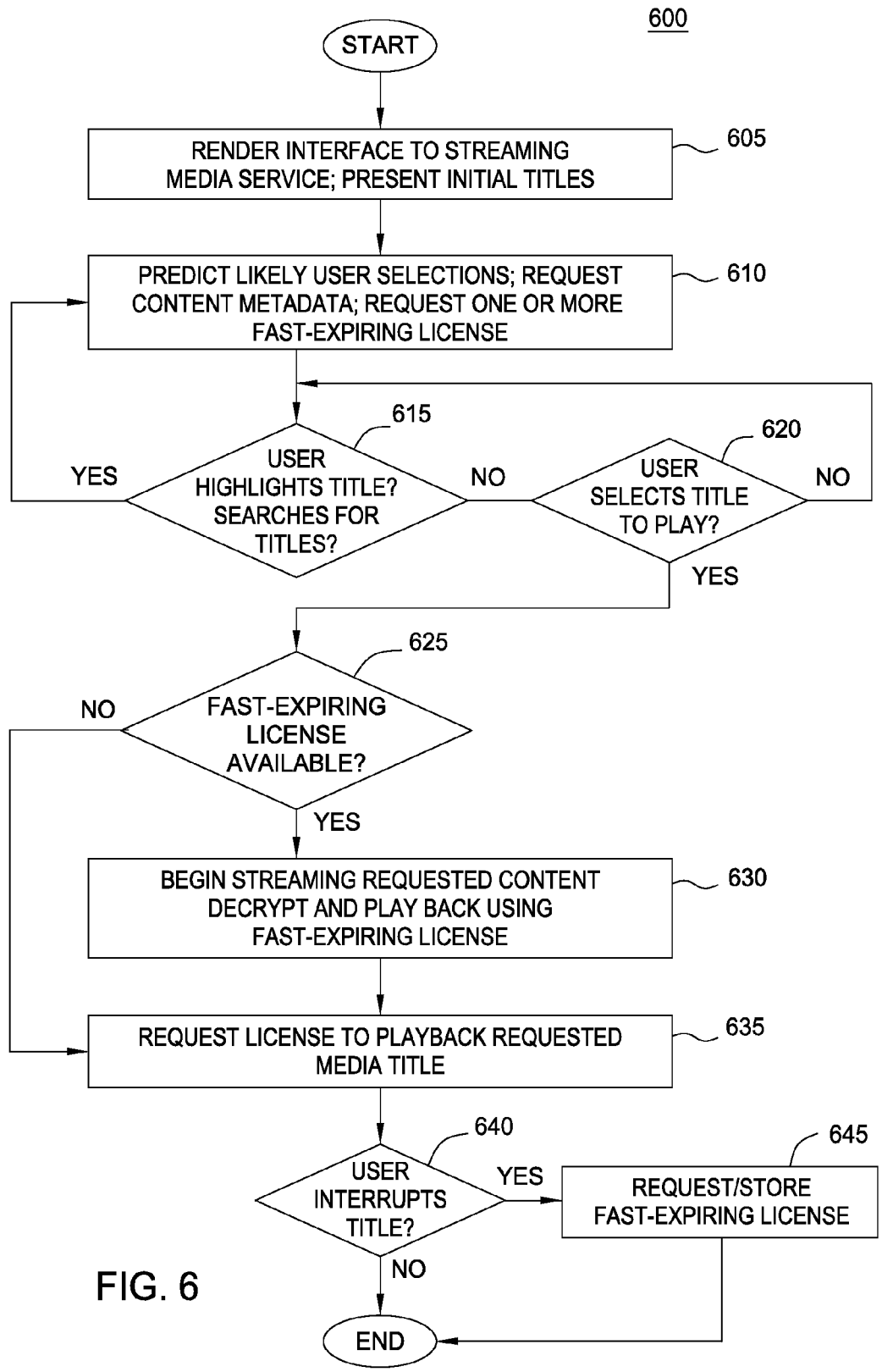
FIG. 6 illustrates a method for a client device to request fast-expiring licensees to reduce the latency for starting playback of a media title, according to one embodiment invention.

FIG. 6 illustrates a method 600 for a client device to request fast-expiring licensees to reduce the latency for starting playback of a media title, according to one embodiment. As shown, the method 600 begins at step 605, where the client device renders a streaming media service on a display. Such a rendering may present an initial collection of titles to a user. In addition, while the interface is presented (and updated in response to user input), the client device may predict what titles the user is likely to select to stream and view. The client device also requests fast-expiring licenses for such titles (step 610). The client device may also be configured to perform a variety of other speculative preauthorization steps for such titles. For example, the client device may download index metadata, URL locations, etc., for such titles.

As noted, the interface may employ a variety of controls used to search for and navigate the media titles available from the streaming media service. For example, at step 615, the client hosting the streaming media interface may determine whether the user has highlighted a particular title or searched for titles. If so, then the method 600 returns to step 610 and determines whether to request fast-expiring licenses for any of the titles previewed or highlighted by the user. Otherwise, once the user selects to play a title at step 620, the client device determines whether a fast-expiring license had been requested for the media title selected by the user to stream (step 625). If so, at step 630, the client device begins streaming the requested content, which may be decrypted using the key associated with the fast-expiring license. As noted, once the used to decrypt and access content, the fast-expiring license has a limited validity period. Such a period is limited to an adequate time for the client device to attempt to obtain a regular license for the same content. Accordingly, at step 635, a DRM component on the client requests a DRM license for the title currently being accessed using the fast-expiring license. Similarly, if (at step 625), the client does not have a fast-expiring license for the title selected by the user, then the client simply requests a regular DRM license to access the requested content.

Presuming the DRM server grants issues a license to the client, then the client device transitions to using the "regular" DRM license to access the media content streamed from the CDN. At step 640, the user may interact with the streaming media interface to interrupt streaming the title. In one embodiment, if the user does so prior to the "end," (e.g., in the middle of a movie), then the DRM component on the client device may request a fast-expiring license that may be used in a subsequent streaming session to continue viewing that same media title.

Advantageously, embodiments presented above reduce (or in many cases virtually eliminate) latency in playback start time for streaming digital media content resulting from digital rights management (DRM) authorizations. In one embodiment, a streaming media client (e.g., a browser, set-top box, mobile telephone or tablet "app") may request a "fast-expiring" license for titles the streaming media client predicts a user is likely to begin streaming. A fast-expiring license is a DRM license (and associated decryption key) which is valid for only a very limited time after being used for playback. During the validity period of such a license, the client device requests a "normal" or "regular" license to continue accessing the title after the fast-expiring license expires.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present invention is determined by the claims that follow.

What is claimed is:

1. A computer-implemented method for presenting content, comprising:
   presenting, in a streaming media interface, a set of one or more media titles available for streaming from a library of media titles;
   prior to receiving a request to stream a first media title of the media titles from the library and requesting a digital rights management (DRM) license to access the first media title, sending a request for a fast-expiring license for at least the first media title, wherein the fast-expiring license is valid for a fixed time interval after playback of the first media title begins, and wherein the fixed interval is substantially less than a playback time of the first media title and is determined based on an amount of time taken to receive the DRM license; and
   prior to receiving the DRM license, receiving the requested fast-expiring license.

2. The method of claim 1, further comprising, prior to receiving a request to stream a media title from the library, sending a request for metadata describing a file storing the first media title.

3. The method of claim 1, further comprising:
   in response to receiving, from a user interacting with the streaming media interface, a request to stream the first media title:
   retrieving an encrypted first portion of the first media title,
      decrypting the encrypted first portion using a key associated with the fast-expiring license, and
      initiating playback of the first portion of the first media title on the streaming media interface.

4. The method of claim 3, wherein the first portion of the first media title resumes viewing the first media title from a point reached during a prior streaming session of the first media title.

5. The method of claim 3, further comprising,
   after receiving the request to stream the first media title:
      generating a request for the DRM license, and
      sending the request to the streaming media service.

6. The method of claim 5, further comprising,
   prior to the end of the fixed time interval:
      receiving the DRM license, and
      accessing portions of the first media title using a key associated with the DRM license.

7. The method of claim 1, wherein the first media title is predicted to be a next selected media title for streaming.

8. The method of claim 1, further comprising sending a request for at least a second fast-expiring license for at least a second one of the media titles.

9. A non-transitory computer-readable storage medium including a program which, when executed, performs an operation for presenting streaming media content, the operation comprising:
   presenting, in a streaming media interface, a set of one or more media titles available for streaming from a library of media titles;
   prior to receiving a request to stream a first media title of the media titles from the library and requesting a digital rights management (DRM) license to access the first media title, sending a request for a fast-expiring license for at least the first media title, wherein the fast-expiring license is valid for a fixed time interval after playback of the first media title begins, and wherein the fixed interval is substantially less than a playback time of the first media title and is determined based on an amount of time taken to receive the DRM license; and
   prior to receiving the DRM license, receiving the requested fast-expiring license.

10. The non-transitory computer-readable storage medium of claim 9, wherein the operation further comprises, prior to receiving a request to stream a media title from the library, sending a request for metadata describing a file storing the first media title.

11. The non-transitory computer-readable storage medium of claim 9, wherein the operation further comprises:
    in response to receiving, from a user interacting with the streaming media interface, a request to stream the first media title:
    retrieving an encrypted first portion of the first media title,
       decrypting the encrypted first portion using a key associated with the fast-expiring license, and
       initiating playback of the first portion of the first media title on the streaming media interface.

12. The non-transitory computer-readable storage medium of claim 11, wherein the first portion of the first media title resumes viewing the first media title from a point reached during a prior streaming session of the first media title.

13. The non-transitory computer-readable storage medium of claim 11, wherein the operation further comprises,
    after receiving the request to stream the first media title:
       generating a request for the DRM license, and
       sending the request to the streaming media service.

14. The non-transitory computer-readable storage medium of claim 13, wherein the operation further comprises,
    prior to the end of the fixed time interval:
       receiving the DRM license, and
       accessing portions of the first media title using a key associated with the DRM license.

15. The non-transitory computer-readable storage medium of claim 9, wherein the first media title is predicted to be a next selected media title for streaming.

16. The non-transitory computer-readable storage medium of claim 9, wherein the operation further comprises sending a request for at least a second fast-expiring license for at least a second one of the media titles.

17. A computing system, comprising:
    a processor; and
    a memory storing an application configured to access streaming media content by performing an operation, the operation comprising:
       presenting, in a streaming media interface, a set of one or more media titles available for streaming from a library of media titles,
       prior to receiving a request to stream a first media title of the media titles from the library and requesting a digital rights management (DRM) license to access the first media title, sending a request for a fast-expiring license for at least the first media title, wherein the fast-expiring license is valid for a fixed time interval after playback of the first media title begins, and wherein the fixed interval is substantially less than a playback time of the first media title and is determined based on an amount of time taken to receive the DRM license, and
       prior to receiving the DRM license, receiving the requested fast-expiring license.

18. The system of claim 17, wherein the operation further comprises, prior to receiving a request to stream a media title from the library, sending a request for metadata describing a file storing the first media title.

19. The system of claim 17, wherein the operation further comprises:
   in response to receiving, from a user interacting with the streaming media interface, a request to stream the first media title:
   retrieving an encrypted first portion of the first media title,
   decrypting the encrypted first portion using a key associated with the fast-expiring license, and
   initiating playback of the first portion of the first media title on the streaming media interface.

20. The system of claim 19, wherein the first portion of the first media title resumes viewing the first media title from a point reached during a prior streaming session of the first media title.

21. The system of claim 11, wherein the operation further comprises,
   after receiving the request to stream the first media title:
   generating a request for the DRM license, and
   sending the request to the streaming media service.

22. The system of claim 21, wherein the operation further comprises,
   prior to the end of the fixed time interval:
   receiving the DRM license, and
   accessing portions of the first media title using a key associated with the DRM license.

23. The system of claim 17, wherein the first media title is predicted to be a next selected media title for streaming.

24. The system of claim 17, wherein the operation further comprises sending a request for at least a second fast-expiring license for at least a second one of the media titles.

* * * * *